(No Model.)

G. F. CHAPPELL.
WATER METER.

5 Sheets—Sheet 1.

No. 490,871.

Patented Jan. 31, 1893.

Witnesses
Geo. W. Breck
Martin Frayden

Inventor
George F. Chappell
By his Attorney
Jacob Felbel.

THE NORRIS PETERS CO., PHOTO-LITHO., WASHINGTON, D. C.

(No Model.)　　　　　　　　　　　　　　　5 Sheets—Sheet 3.
G. F. CHAPPELL.
WATER METER.

No. 490,871.　　　　　　　　　　Patented Jan. 31, 1893.

Witnesses
Geo. W. Breck
Martin Brayden

Inventor
George F. Chappell
By his Attorney
Jacob Felbel (No Model.) 5 Sheets—Sheet 4.
G. F. CHAPPELL.
WATER METER.

No. 490,871. Patented Jan. 31, 1893.

Witnesses
Geo. W. Breck
Martin Layden

Inventor
George F. Chappell
By his Attorney
Jacob Felbel

THE NORRIS PETERS CO., PHOTO-LITHO., WASHINGTON, D. C.

(No Model.) 5 Sheets—Sheet 5.

G. F. CHAPPELL.
WATER METER.

No. 490,871. Patented Jan. 31, 1893.

Witnesses
Geo. W. Breck.
Martin Layden

Inventor
George F. Chappell
By his Attorney
Jacob Felbel ns of this page.

UNITED STATES PATENT OFFICE.

GEORGE F. CHAPPELL, OF NEW YORK, N. Y.

WATER-METER.

SPECIFICATION forming part of Letters Patent No. 490,871, dated January 31, 1893.

Application filed September 6, 1889. Serial No. 323,171. (No model.)

*To all whom it may concern:*

Be it known that I, GEORGE F. CHAPPELL, a citizen of the United States, and a resident of New York city, in the county of New York and State of New York, have invented certain new and useful Improvements in Water-Meters, of which the following is a specification.

My invention relates to that class of water meters known as piston meters, and has for its main objects, simplicity of construction, economy of manufacture, durability, and effectiveness of operation.

To these ends my invention consists in the various features of construction and combinations of devices hereinafter more fully described and particularly pointed out in the appended claims.

Figure 1:
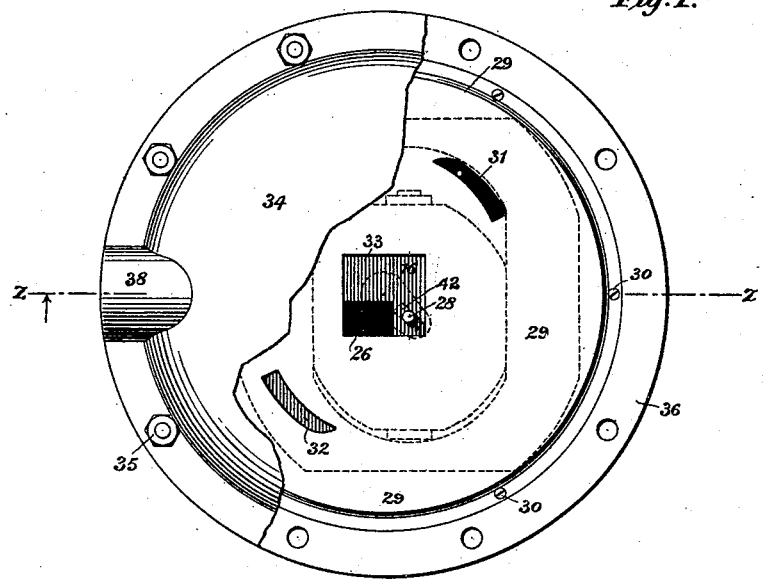
Figure 2:
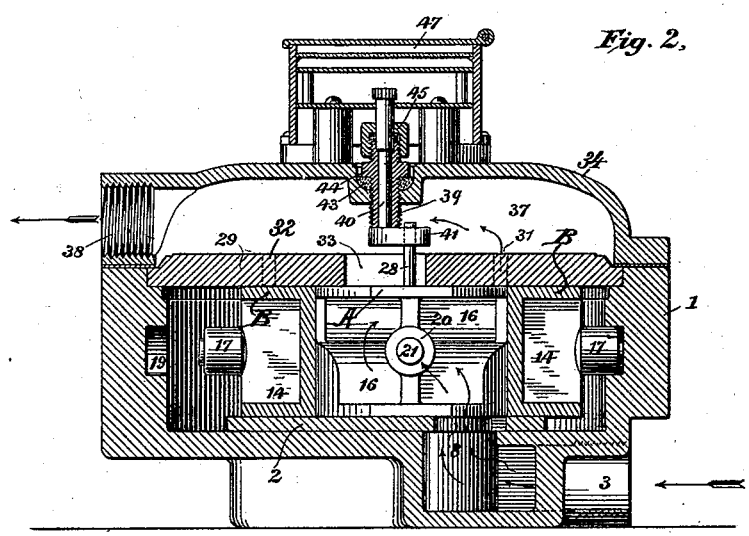
Figure 3:
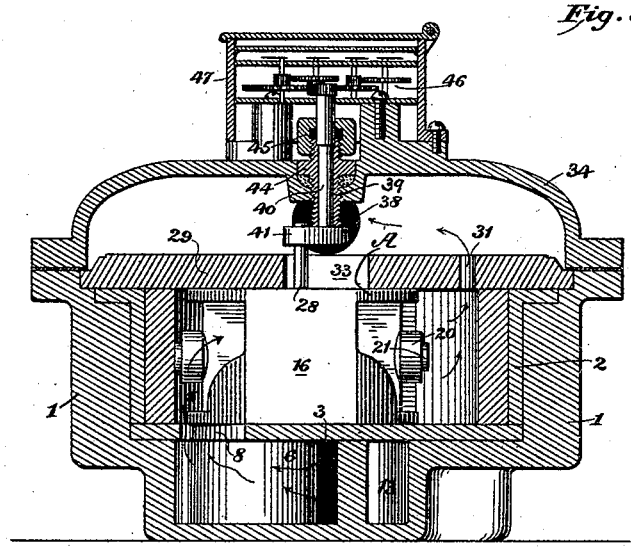
Figure 4:
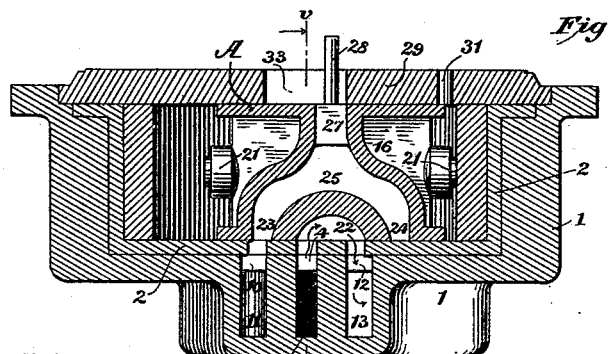
Figure 5:
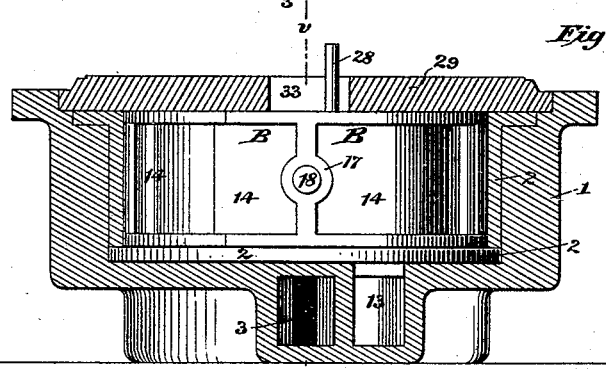
Figure 6:
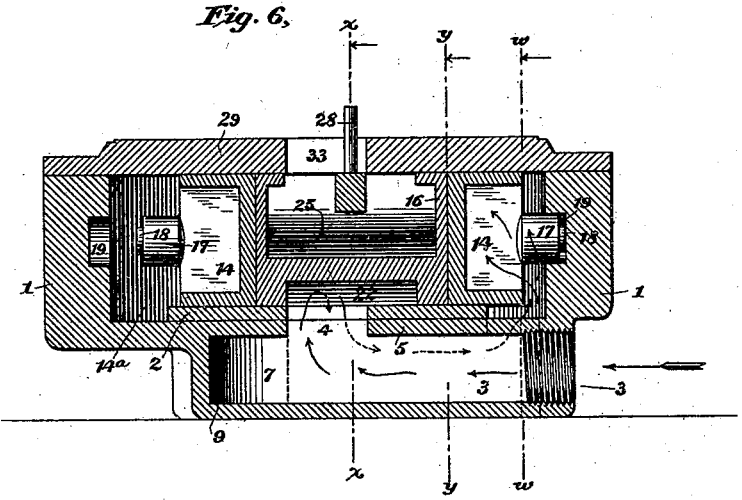
Figure 7:
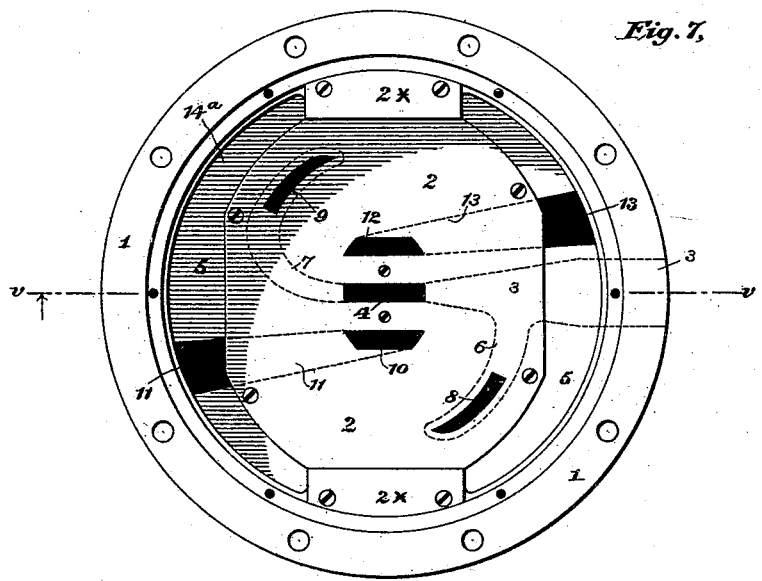
Figure 8:
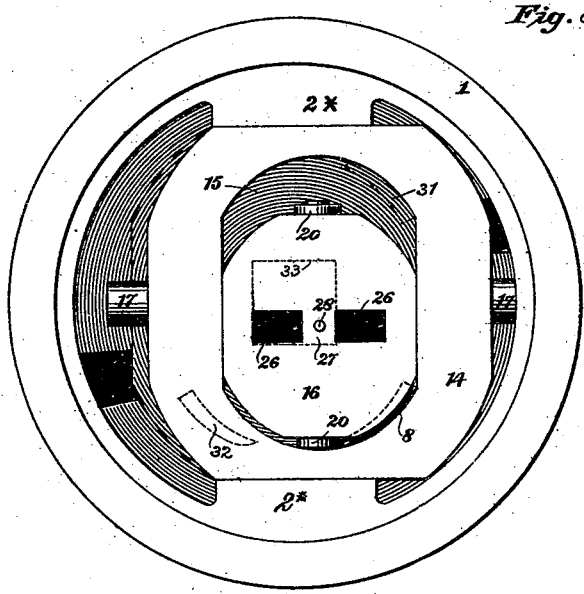
Figure 9:
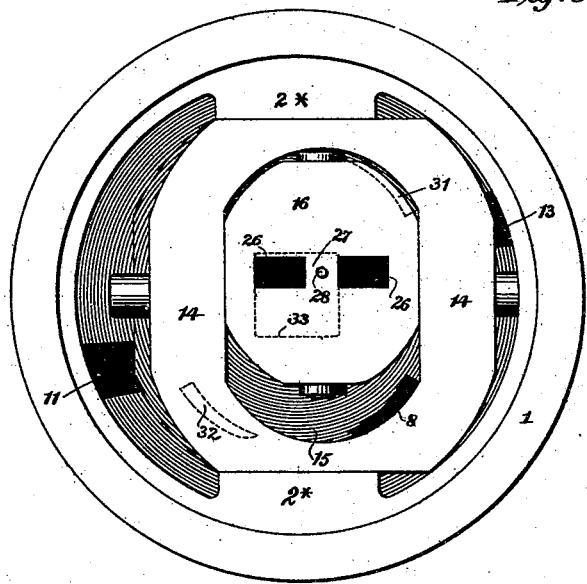
Figure 10:
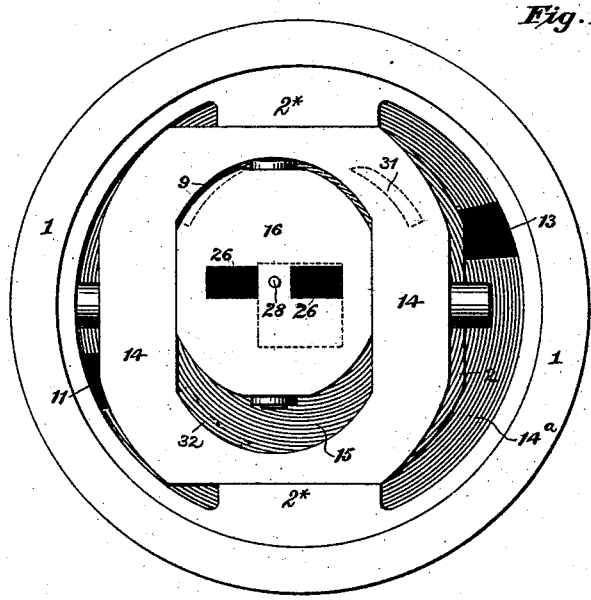
Figure 11:
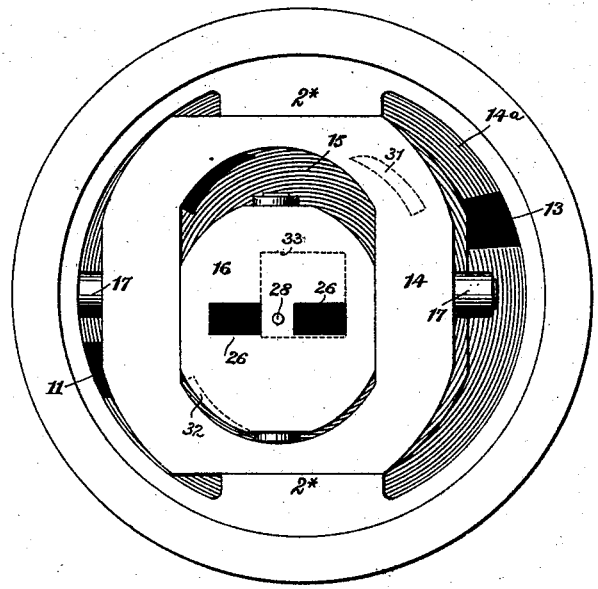

In the accompanying drawings, forming part of my application, and showing one form in which my invention may be carried out, Figure 1 is a top plan view of the meter with a portion of the cover or lid broken away and the registering devices removed. Fig. 2 is a vertical section of the same, taken at the line $z$, $z$, Fig. 1, and with the removed parts replaced. Fig. 3, is a vertical section through the entire machine taken at the plane represented by the line $y$, $y$, of Fig. 6. Fig. 4, is a vertical section through the pistons and casing taken at the plane represented by the line $x$, $x$, of Fig. 6. Fig. 5, is a similar section taken at the plane represented by the line $w$, $w$, of Fig. 6. Fig. 6, is a similar section taken at the lines $v$, $v$, of Figs. 4, 5, and 7. Fig. 7, is a top plan view of the casing and piston-chamber. Fig. 8, is a similar view with the pistons in place and in the first position. Fig. 9 is a similar view showing the inner piston in its second position. Fig. 10 is a similar view showing the outer piston in its second position and the inner piston in its third position. Fig. 11 is a similar view showing the inner piston in its fourth position.

In the several views the same part will be found designated by the same numeral or letter of reference.

1 represents the casing or body of the machine made preferably of cast iron and provided interiorly if desired with a lining 2 of brass, bronze, or other suitable material. At or in the base of the casing is formed or provided an inlet or passage-way 3, which leads to a port 4 formed in the bottom 5 of the casing, and also by branches 6 and 7, to lateral ports 8 and 9 likewise formed in the bottom of the casing. On one side of the port 4 is provided, in the bottom of the casing, a port 10, and in the base a passage-way 11, leading therefrom. On the other side of said port 4 and in the bottom plate of the casing another port 12, is provided from which leads another passage-way 13, formed in the base of the structure and extending in a direction opposite to that in which the passage-way 11 extends. The lining 2 when employed should of course be cut out at localities registering with the several ports 4, 8, 9, 10 and 12.

14 designates a piston adapted to be reciprocated within the circular chamber $14^a$ formed above the bottom-plate and the ports and passage-ways hereinbefore referred to. The said piston is hollowed out or formed with an opening 15 to receive a smaller, second piston 16, which is adapted to be reciprocated within the opening 15 formed in the outer piston and in a direction preferably at right angles to that in which the latter is reciprocated. The outer or main piston 14 is not an inclosed vessel but consists of a shell-like body having four vertical sides not closed at top or bottom, but confined at top and bottom between the cover or top plate 29, and the bottom plate 5, between which plates it reciprocates longitudinally, the upper and lower edges of its sides being in contact with or next to them. The inner or central piston 16 is placed in the open space between the vertical sides or walls of the main piston 14, with which it is flush at top and bottom, the bottom of the inner piston resting on the bottom plate 5 and its top being in contact with or directly under the cover plate 29 of the machine. It is obvious from the construction and arrangement of the two pistons that the outer or main piston forms a yoke or frame for the inner or central piston 16, so that as the outer piston is pushed back and forth by the action of the liquid against it, it shoves the inner piston along with it back and forth, both sliding on the bottom plate 5.

In the casing or body of the machine I provide projecting side walls $2^×$ seen in Figs. 7, 8 and 9 between which the outer piston reciprocates and which complete and form the piston chamber 14ᵃ. The said walls 2ˣ are formed on the case and are covered by the inner lining 2 hereinbefore mentioned.

The main piston is provided at either end with a stud 17, preferably provided with a vulcanized rubber tip 18, which enters a cavity or recess 19 formed in the wall of the casing, for the purpose of reducing the shock or thrust of the piston at the end of its movement in either direction and for lessening the vibration and noise when the machine is in operation. The second or inner piston is also provided at either end with studs or lugs 20, having rubber tips 21, which strike against the inner side walls of the hollow or open main piston, and lessen the shock, vibration and noise of the inner, auxiliary piston at the end of its stroke in either direction. The outer piston is adapted in its movements to alternately cover and uncover the ports 8 and 9. The inner piston is adapted in its movements to control the ports 4, 10 and 12, and to this end is hollowed out or recessed at its under side as seen at 22, and is formed or provided with ports 23, 24, one on each side of said recess. These ports 23, and 24, are connected by a passage-way 25, formed interiorly of the inner piston above the recess or port 22, which passage-way communicates with a port 26 formed at the upper side of said piston. At said port 26, and dividing the same is a web or bridge-piece 27, for the support of a pin or stud 28 whose function will be presently referred to. It will be observed that the exteriors of both pistons 14 and 16 are of curved or circular form as well as the interior of the outer piston. My object in giving a curved or circular shape to the pistons is to lighten and strengthen the pistons and keep the piston chamber in the outer piston in proper shape and prevent it from becoming bent or put out of shape during the operation of the machine.

In the circular chamber 14ᵃ are placed two projecting pieces 2ˣ, 2ˣ, between which the outer piston reciprocates and which serve in conjunction with the outer piston to divide the said chamber 14ᵃ into two parts which are not directly communicable and which prevent the water from passing from one to the other and compel the water to go through the ports.

Above the upper flush surfaces of the two pistons is provided a diaphragm or cover-plate 29, which by screws 30 is secured to a flange formed on the casing lining 2. This diaphragm is provided with two outlet ports 31 and 32, and with an opening 33, square in configuration, in which the pin or stud 28 moves, and which also serves as a port. The ports 31 and 32 are adapted to be opened and closed alternately by the upper face of the outer piston.

34 designates the top-plate or cover of the machine secured by bolts and nuts 35 to the horizontal flange 36 of the casing. The said cover-plate is recessed or formed in the shape of a bell or dome to provide a chamber 37 and an outlet pipe-section or nozzle 38. The cover 34 is perforated and threaded centrally to receive a screw-bushing 39, made tubular to accommodate and afford a bearing for a shaft or spindle 40 whose lower end within the chamber 37 is provided with an arm or crank 41, slotted at 42 for the reception of the upper free end of the pin or stud 28.

To prevent leakage at the threaded perforation in the cover, a packing 43 is provided which is compressed in a suitable seat by a flange 44 on the screw-bushing; and to avoid any escape of the fluid through the tubular portion of the screw-bushing a stuffing-box 45 is provided.

The upper end of the spindle or shaft 40, is provided with a gear 46, or other device to cooperate with the usual registering train or mechanism, mounted in the box or case 47, secured to the top-plate 34, in a manner to be driven by the rotatory spindle or shaft 40. By the back-and-forth movements of the two pistons within their respective chambers, the pin or stud 28, affixed to the inner piston, is caused to move in or describe the outline of a square, rectangle, or quadrilateral figure, and by the connection between said pin or stud and the slotted crank or arm 41, the spindle or shaft 40 is given a continuous rotary motion.

In order that the mode of operation of the machine may be more fully understood by those skilled in the art, I shall now proceed to give a detailed description thereof, assuming the meter to have been connected to the service pipes in the usual manner, and the pistons to be in the positions or at the locality shown at Figs. 1 and 8. The piston 14 now covers the port 32 in the diaphragm and the ports 4 and 10 are in open communication through the recess or channel 22 in the under side of the piston 16. The fluid under pressure entering the inlet 3 passes through the port 8 and pressing upon the inner piston drives it forward in the opening or chamber in the larger outer piston, to the position illustrated at Figs. 4 and 9, the water or other fluid in front of said inner piston being forced out, through the port 31 in the diaphragm, into the chamber 37, to make its exit by way of the outlet-pipe or nozzle 38. This movement of the inner piston operates to effect communication between the port 4 and the port 12 by way of the channel 22 in the inner piston. The water now passes up through the port 4, through the channel 22, down through the port 12, along the passageway 13 and up behind the outer piston, as indicated at Figs. 4, 6, 7 and 9. Pressing against the outside of said piston, the water forces both it and the inner piston to the left (in the drawings) as illustrated at Fig. 10, thus closing the port 31 and opening the port 32. At the same time the outer piston closes the port 8 and opens the port 9. As the piston moves thus toward the left the water in front of it is caused to return through the passage-way 11 pass up through the ports 10 and 23, which are now in register, through the passage-way 25 and up and out through the ports or openings 26 and 33 into the discharge-chamber 37. The port 9 being now uncovered the water passes up behind the inner piston and drives the same forward to the position shown at Fig. 11, the outer piston remaining stationary during this operation. While the inner piston is making the stroke last described, the water in front of it is forced out through the open port 32 into the discharging-chamber 37. In moving forward to the position shown at Fig. 11, the inner piston again brings the ports 4 and 10 into communication through channel 22, and also brings the ports 12 and 24 into register or alignment. Immediately communication is established between the ports 4 and 10, the water from the inlet 3, flowing through the conduit 11, passes behind the outer piston on the left hand side, and presses it with its inclosed inner piston toward the right to the position illustrated at Fig. 8, the water in front of said outer piston being simultaneously driven out into the chamber 37, *via* the passage-way 13, the ports 12 and 24, the passage-way 25, and the ports or openings 26 and 33. By this last movement of the pistons the port 8 is again opened and the inner piston is started forward alone again in the manner at first explained.

It will be observed that the outer piston is merely driven back and forth or reciprocated while the inner or second piston is moved in the path of a square or rectangle continuously. It will also be observed that the movements of the inner piston at right angles to the path of reciprocation of the outer piston are effected by the direct action or pressure of the fluid on said inner piston and that the movements of the latter in the directions of reciprocation of the main piston are due to the inclosure of the inner piston by the outer piston and its adaptability to be carried by the latter when the pressure of the fluid is caused to act upon the same.

Briefly, the movements of the pistons are as follows:—First, the inner piston moves alone in a right line within the space formed in the outer piston; secondly, the outer and the inner piston move together in a right line, at right angles to that in which the inner piston first moved; thirdly, the inner piston moves alone in a straight line parallel with that in which it first moved; and fourthly, the outer and the inner piston move together in a straight line at right angles to that in which the inner piston last moved. Thus, while the outer piston makes one complete back-and-forth movement the inner piston makes four movements and describes the outline of a square. The pin or stud 28 being fast on said inner piston is consequently caused to move also in the path of a square, or describe a quadrilateral figure. The movement of the pin or stud being continuous and always in the same onward or forward path or direction, the slotted crank 41 is given a continuous rotary motion which is imparted to its shaft or spindle and the gear or device which actuates the registering train or mechanism.

The quantity of water discharged into the chamber 37, through the ports 31, 32, and 33 in the diaphragm during each complete revolution of the crank and spindle, being known, the registering mechanism is constructed accordingly and thus the flow of the fluid through the meter may be accurately measured or ascertained.

At Figs. 2, 3, 4, and 6, arrows are drawn to indicate the direction of flow of the fluid, and at Figs. 8, 9, 10 and 11, I have shown in dotted lines to facilitate an understanding of the operation of the machine, the ports 31 and 32 and the opening 33 which are in practice provided in the diaphragm or cover 29.

It will be apparent to those skilled in the art that numerous changes in detail construction and arrangement may be made without departing from the spirit or principle of my invention, and for this reason I do not wish to be considered as limiting my improvements to a machine in which the various parts are constructed and arranged in precisely the manner exhibited in my drawings.

My invention is adapted for embodiment in a steam engine, pump, motor, or analogous machine and hence I do not restrict myself solely to water-meters.

Although I have designed and described the lines of motion of the pistons as right lines and the directions as at right angles to one another, this though preferred is not essential, as the pistons may be moved at any desired angles to each other, and the paths of motion may be curved paths.

I do not limit myself to one inner piston and chamber as several inner pistons and chambers may be employed in a manner similar to that herein shown.

It will be observed from the drawings that the pistons 14 and 16 are made with overhanging flanges so that the weight of the pistons is reduced while their exterior form is preserved, and so that the water in its outward flow will exert a lifting action upon the flanges and consequently counteract the weight of the pistons and relieve them in some measure from friction arising from their contact with the case and the bottom plate. 5. These flanges are best seen in Figs. 2, 3 4, 5 where the letter B designates the upper flanges of the outer piston 14, and the letter A designates the upper flanges of central piston 16.

What I claim as new and desire to secure by Letters Patent, is:—

1. In a meter or analogous machine, an outer reciprocatory piston, a central piston within the same and moving therewith and having also transverse reciprocations independent of those of the outer piston, in combination with the stud 28, spindle 40 and the slotted crank 41 and the cover 34 which forms a discharging chamber, substantially as shown and described.

2. In a meter or analogous machine the combination with a piston chamber provided with inlet ports, of an outer piston and a central piston placed therein and provided with ports, a cover over both pistons provided with outlet ports, and a cover which forms a discharging chamber substantially as shown and described.

3. In a meter or analogous machine the combination with the outer piston and the central piston, operating as described, of a stud or pin on the inner piston, an inner cover, an outer cover, a power shaft or spindle and a crank, substantially as shown and described.

4. In a meter or analogous machine, the combination with a piston chamber provided with inlet ports and passage ways 3, 4, 6, 7, 8, 9, 10, 11, 12, 13 of an outer piston a central piston provided with ports and passage ways, 22, 23, 24, 25, 26 and a cover provided with outlet ports or openings 31, 32, 33, substantially as set forth and described.

5. In a meter or analogous machine the combination with a piston chamber provided with suitable ports, of an outer piston adapted to be reciprocated therein, a central piston adapted to reciprocate with the outer piston and also to have transverse reciprocations within the outer piston, said central piston being provided with suitable ports and passage ways, a pin or stud on the central piston, a cover over both pistons provided with outlet ports and with an opening to permit of the movements of the stud 28, a spindle 40, and the slotted crank arm 41, and the cover 34 to form a discharging chamber, substantially as described.

6. In a meter or analogous machine, a piston provided with a recess 22 and water-ways 23, 24, 25, said piston being adapted to move within an outer piston and to form a valve therefor, substantially as set forth and described.

7. The combination with the chamber 14$^a$, of the hollow outer piston 14 adapted to reciprocate therein, the central piston 16 adapted to reciprocate in piston 14, the stud 28 on piston 16, the spindle 40, the gear 46, and the slotted crank 41, substantially as and for the purpose described.

8. In a meter or analogous machine containing an outer and a central piston, an internal cover 29, provided with outlet ports 31 and 32 and a central opening 33, said internal cover being arranged to constitute a valve face for both the outer and central pistons, substantially as described.

9. In a meter or analogous machine, an outer piston provided with an internal piston chamber receiving an inner or central piston, said outer piston with its internal chamber constituting a valve for actuating the central piston, and a cover having ports into which the internal piston chamber of the outer piston directly discharges, substantially as shown and described.

10. In a meter or analogous machine the combination with an outer piston and a central piston operating substantially as described, of a stud on the central piston, a power shaft or spindle, an inner cover 29, an outer cover to form a discharging chamber, and a slotted crank in whose slot 42 the stud 28 is placed, substantially as described.

11. In a meter or analogous machine, the combination of a case having two inwardly projecting side walls $2^\times 2^\times$, and provided with suitable passage ways and ports in the bottom of the case, and forming a valve face for two pistons, and an internal cover having suitable passage ways and ports, and arranged to form a valve face for two pistons, of an outer dome or dome-shaped cover to form a discharging chamber for both pistons, substantially as shown and described.

12. In a meter or analogous machine a circular piston chamber 14$^a$ provided with projections $2^\times 2^\times$ at opposite sides, and provided with inlet ports, an outer and a central piston placed therein and provided with ports, a cover over both pistons provided with outlet ports, and a cover which forms a discharging chamber, substantially as shown and described.

Signed at New York city, in the county of New York and State of New York, this 30th day of August, A. D. 1889.

GEORGE F. CHAPPELL.

Witnesses:
MARTIN LAYDEN,
JACOB FELBEL.